US008180070B2

(12) United States Patent
Tatsumi

(10) Patent No.: US 8,180,070 B2
(45) Date of Patent: May 15, 2012

(54) HOWLING SUPPRESSING APPARATUS

(75) Inventor: Hirotaka Tatsumi, Ota (JP)

(73) Assignees: Semiconductor Components Industries, LLC, Phoenix, AZ (US); Sanyo Semiconductor Co., Ltd., Gunma (JP)

( * ) Notice: Subject to any disclaimer, the term of this patent is extended or adjusted under 35 U.S.C. 154(b) by 922 days.

(21) Appl. No.: 12/195,336

(22) Filed: Aug. 20, 2008

(65) Prior Publication Data

US 2009/0052691 A1 Feb. 26, 2009

(30) Foreign Application Priority Data

Aug. 22, 2007 (JP) ................................ 2007-216322
Aug. 30, 2007 (JP) ................................ 2007-224558

(51) Int. Cl.
*H04B 15/00* (2006.01)

(52) U.S. Cl. ...................................................... 381/94.1

(58) Field of Classification Search .................... 381/66, 381/94.1
See application file for complete search history.

(56) References Cited

U.S. PATENT DOCUMENTS 5,515,404 A * 5/1996 Pearce .......................... 375/371
5,677,987 A * 10/1997 Seki et al. ..................... 704/226

FOREIGN PATENT DOCUMENTS

| | | |
|---|---|---|
| JP | 60-126998 | 7/1985 |
| JP | 06-164278 | 6/1994 |
| JP | 07-143034 | 6/1995 |
| JP | 11-146484 | 5/1999 |
| JP | 2004-274122 | 9/2004 |
| JP | 2006-217542 | 8/2006 |
| JP | 2006-261967 | 12/2006 |
| JP | 2007-329805 | 12/2007 |
| JP | 2008-005305 | 1/2008 |
| WO | WO 2007037029 A1 * | 4/2007 |

OTHER PUBLICATIONS

Japan Patent Office, Notification of Reasons for Rejection for Application No. 2007-216322, Mail Date Sep. 27, 2011.
Japan Patent Office, Notification of Reasons for Rejection for Application No. 2007-224558, Mail Date Sep. 27, 2011.

* cited by examiner

*Primary Examiner* — Marcos D. Pizarro
*Assistant Examiner* — Suian Tang
(74) *Attorney, Agent, or Firm* — SoCal IP Law Group LLP; Steven C. Sereboff; John E. Gunther

(57) ABSTRACT

A howling suppressing apparatus includes: a detecting unit configured to detect howling of input audio signals; a plurality of filters configured to apply a filter process sequentially to the audio signals to be output; and a setting unit configured to set a filter coefficient for suppressing the howling detected by the detecting unit for a filter among the plurality of filters, in which filter no filter coefficient for suppressing howling is set, and set a filter coefficient for suppressing the howling detected by the detecting unit for any one of the plurality of filters, if filter coefficients for suppressing howling are set in all of the plurality of filters, based on the detection result from the detecting unit.

12 Claims, 14 Drawing Sheets

HOWLING SUPPRESSING APPARATUS

CROSS-REFERENCE TO RELATED APPLICATION

This application claims the benefit of priority to Japanese Patent Application Nos. 2007-216322 and 2007-224558, filed Aug. 22, 2007 and Aug. 30, 2007, respectively, of which full contents are incorporated herein by reference.

BACKGROUND OF THE INVENTION

1. Field of the Invention

The present invention relates to a howling suppressing apparatus.

2. Description of the Related Art

An audio apparatus including a microphone etc. and a speaker etc. forms a feed-back loop when an audio signal output from the speaker travels as a wave to and is input into the microphone. Therefore, howling may be generated depending on the environment for setting up the audio apparatus, the sound volume set for the speaker, positional relationship between the microphone and the speaker etc. To suppress the howling, generally a howling suppressing apparatus is used that detects a frequency band where the howling is generated to suppress the level of the audio signal in the frequency band (e.g., Japanese Patent Application Laid-Open Publication Nos. 7-143034 and 2004-274122). FIG. 11 shows a general howling suppressing apparatus 300. A detecting unit 400 divides an audio signal from a microphone amplifier 310 into a plurality of frequency bands and detects howling in each frequency band. The controlling unit 410 sequentially sets a filter coefficient for suppressing the howling for a plurality of notch filters (NF) 420-1 to **420-*n* based on the detection result of the detecting unit 400. Therefore, the notch filter 420-*n*** outputs an audio signal with the howling suppressed.

By the way, in the case of an audio apparatus used for karaoke, since the sound volume set for speakers and a position of a microphone relative to the speakers are frequently changed, occurrence condition of howling is accordingly changed and the howling tends to occur for a greater number of times. However, since the howling suppressing apparatus 300 sets a filter coefficient for suppressing the howling for the notch filters 420-1 to **420-*n*** when the howling is detected, it is problematic that the howling cannot be suppressed if the howling is detected for the number of times greater than the number of the notch filters.

SUMMARY OF THE INVENTION

A howling suppressing apparatus according to an aspect of the present invention includes: a detecting unit configured to detect howling of input audio signals; a plurality of filters configured to apply a filter process sequentially to the audio signals to be output; and a setting unit configured to set a filter coefficient for suppressing the howling detected by the detecting unit for a filter among the plurality of filters, in which filter no filter coefficient for suppressing howling is set, and set a filter coefficient for suppressing the howling detected by the detecting unit for any one of the plurality of filters, if filter coefficients for suppressing howling are set in all of the plurality of filters, based on the detection result from the detecting unit.

Other features of the present invention will become apparent from descriptions of this specification and of the accompanying drawings.

BRIEF DESCRIPTION OF THE DRAWINGS

For more thorough understanding of the present invention and advantages thereof, the following description should be read in conjunction with the accompanying drawings, in which.

DETAILED DESCRIPTION OF THE INVENTION

At least the following details will become apparent from descriptions of this specification and of the accompanying drawings.

First Embodiment

Figure 1:
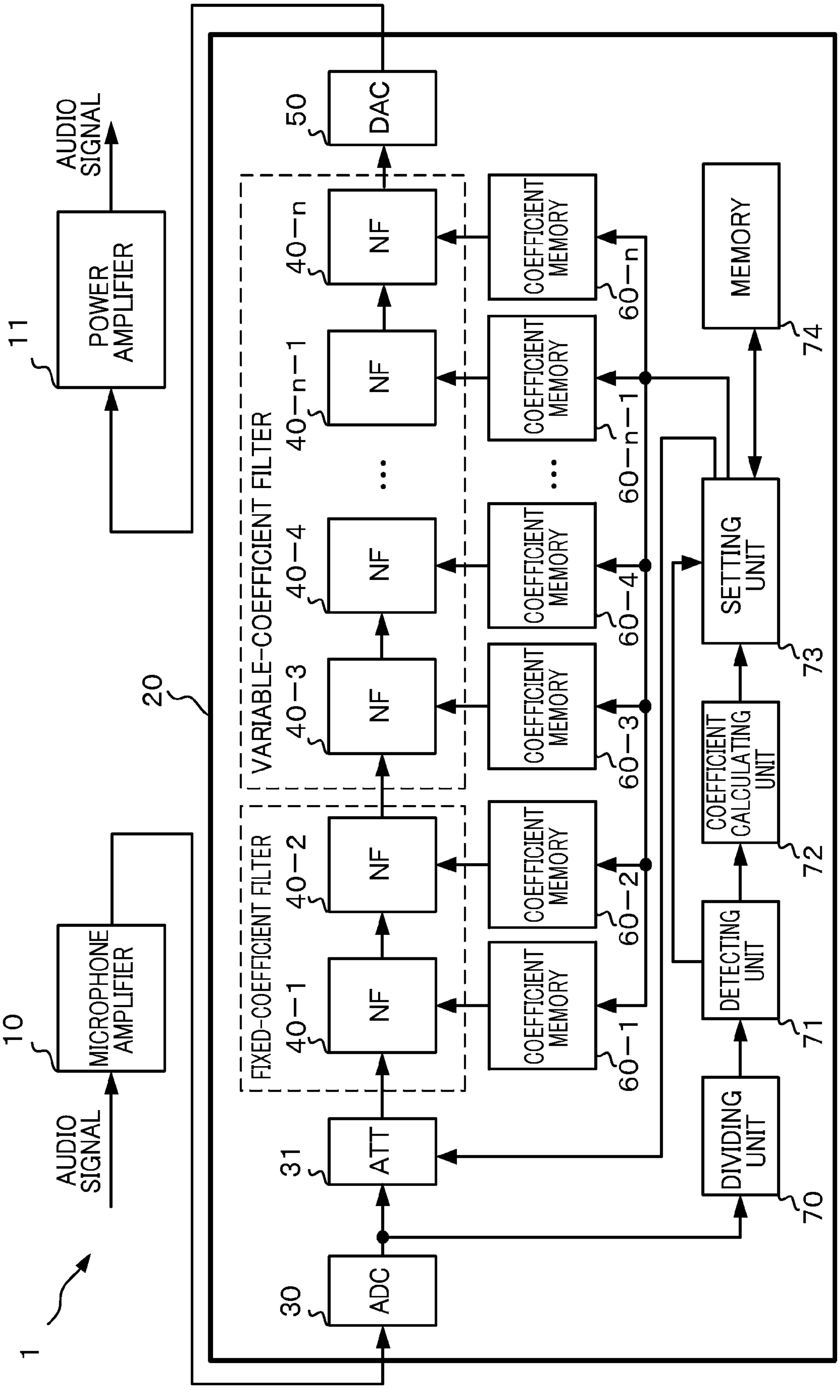
FIG. 1 depicts a first embodiment of an audio apparatus to which the present invention is applied.

FIG. 1 depicts a first embodiment of an audio apparatus to which the present invention is applied. An audio apparatus 1 shown in FIG. 1 is an apparatus that amplifies and outputs audio signals input from a microphone (not shown) etc., to a speaker (not shown) etc., while suppressing the howling and includes a microphone amplifier 10, a power amplifier 11, and a howling suppressing apparatus 20.

The microphone amplifier 10 is a circuit that amplifies the analog audio signal from the microphone (not shown) to reach a level processible in the howling suppressing apparatus 20 and can be non-inverting amplifier using an operational amplifier, for example.

The power amplifier 11 is a circuit that amplifies the audio signal output from the howling suppressing apparatus 20 to a level capable of driving the speaker etc.

The howling suppressing apparatus 20 is an apparatus that suppresses the howling of the audio signal output from the microphone amplifier 10 to output the signal to the power amplifier 11 and includes an AD convertor (ADC) 30, an attenuator (ATT) 31, notch filters (NF) 40-1 to **40-*n*, a DA convertor (DAC) 50, coefficient memories 60-1 to 60-*n*, a dividing unit 70, a detecting unit 71, a coefficient calculating unit 72, a setting unit 73, and a memory 74. For example, a DSP (digital signal processor) including an AD converter and a DA converter can be employed for the howling suppressing apparatus 20** of the first embodiment.

The AD convertor 30 converts the analog audio signal output from the microphone amplifier 10 into digital audio signal.

The attenuator 31 can attenuate the level of the audio signal output from the AD convertor 30 to the notch filter 40-1. In the first embodiment, the attenuation amount of the attenuator 31 is set at zero by default.

The notch filters 40-1 to **40-*n* constitute n filters for suppressing the howling, and the frequency characteristics are determined based on the filter coefficients set in the coefficient memories 60-1 to 60-*n*. The notch filters 40-1 to 40-*n*** of the first embodiment include fixed-coefficient filters having filter coefficients not changed after the filter coefficients are set in the coefficient memories and variable-coefficient filters having filter coefficients variable after the setting.

The DA convertor 50 converts the digital audio signal output from the notch filter **40-*n* into analog signal and outputs the signal to the power amplifier 11**.

The coefficient memories 60-1 to **60-*n* constitute n memories having the respective filter coefficients set for the notch filters 40-1 to 40-*n* and are respectively assigned with addresses A1 to An. It is assumed that the address values are increased in the order of the addresses A1 to An and that the coefficient memories have filter coefficients set such that the frequency characteristics of the notch filters 40-1 to 40-*n*** becomes flat by default.

The dividing unit 70 divides the digital audio signal converted by the AD convertor 30 into a plurality of frequency bands with FFT (Fast Fourier Transform), for example. In the first embodiment, it is assumed that the audio signal input to the dividing unit 70 is divided into frequency bands of a total number of i.

Figure 2:
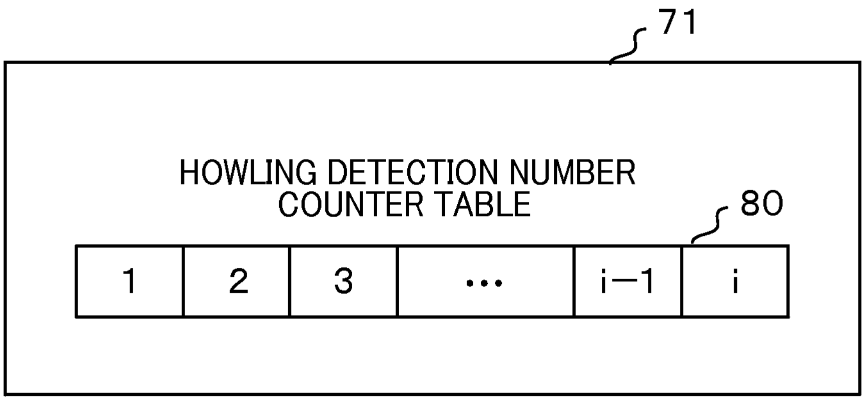
FIG. 2 depicts an example of a counter table for counting the number of times of detection of howling.

The detecting unit 71 compares the peak level of the audio signal in each frequency band divided by the dividing unit 70 with a threshold value of a predetermined level and detects howling by determining that howling occurs if the peak level of the audio signal exceeds the threshold value of the predetermined level. In the first embodiment, the threshold value is stored in a threshold value storage unit (not shown) provided in the detecting unit 71. The detecting unit 71 is provided with a howling detection number counter table 80 as shown in FIG. 2. The howling detection number counter table 80 is a table having the number of times of detection of howling stored thereon as count values for each of the i divided frequency bands. In the first embodiment, the count value of each frequency band is "0" by default, and if howling is detected, the detecting unit 71 increments the count value by one in the frequency band with the howling detected. The count value is also compared with a specified number of times predetermined by the detecting unit 71 for each frequency band of the howling detection number counter table 80 and the comparison result is output to the setting unit 73. It is assumed that the specified number of times of the first embodiment is greater than n, which is the number of the notch filters.

The coefficient calculating unit 72 calculates the center frequencies, Q-values, etc., of the notch filters 40-1 to **40-*n* to suppress the howling detected by the detecting unit 71**.

The setting unit 73 refers to the detection result and the comparison result of the detecting unit 71, the calculation result of the coefficient calculating unit 72, and various data stored in the memory 74 to control the howling suppressing apparatus 20. Specifically, the setting unit 73 sets the filter coefficients for suppressing the howling in the coefficient memories 60-1 to **60-*n* and sets the attenuation amount of the attenuator 31. The setting unit 73 also writes various data into a writable area of the memory 74. The setting unit 73 of the first embodiment is provided with a pointer for addressing of the coefficient memories 60-1 to 60-*n*, and the filter coefficient is set in the coefficient memory addressed by the pointer. The addressing of the coefficient memories 60-1 to 60-*n* is performed by a decoder (not shown) that decodes the value of the pointer provided in the setting unit 73, for example. In the first embodiment, it is assumed that the value of the pointer is zero by default and that the value of the pointer is incremented by one when the detecting unit 71** detects howling.

Figure 3:
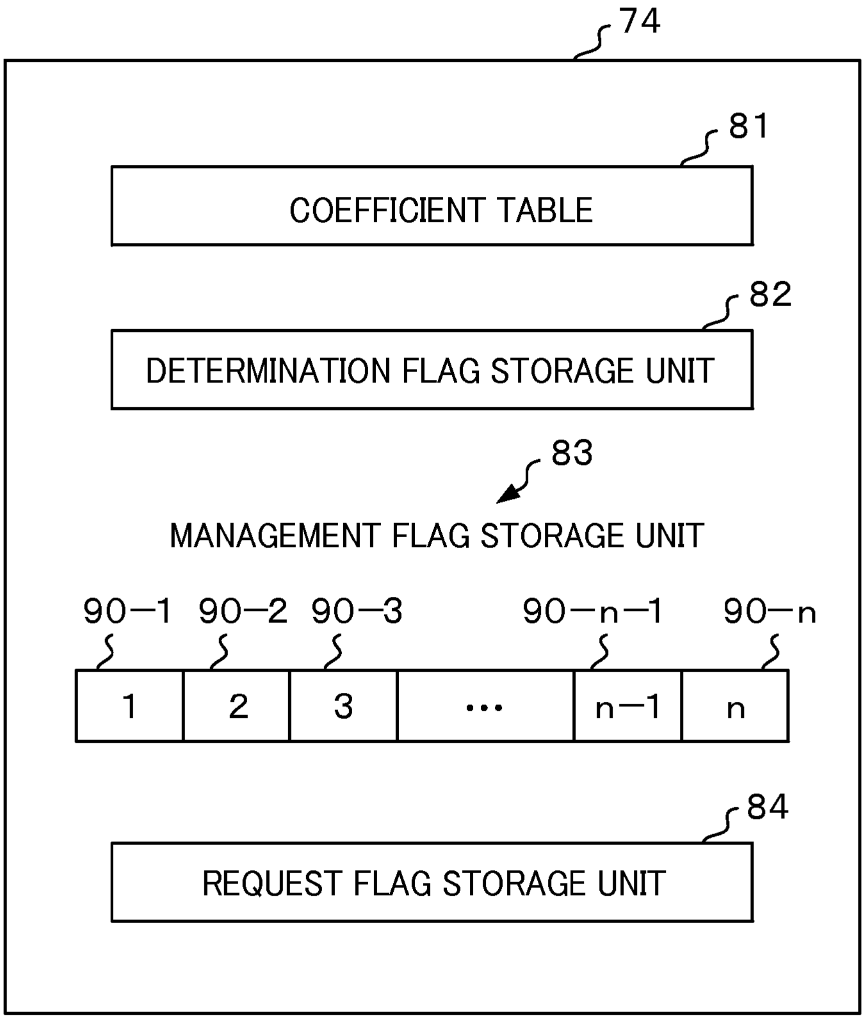
FIG. 3 depicts an example of a storage unit included in a memory 74.

The memory 74 has stored thereon various data necessary for controlling the howling suppressing apparatus 20 of the first embodiment and has a writable area for the setting unit 73. FIG. 3 depicts a part of the storage area included in the memory 74. The memory 74 of the first embodiment includes a ROM (Read Only Memory) and a RAM (Random Access Memory); the storage area of the ROM is provided with a coefficient table 81; and the storage area of the RAM is provided with a determination flag storage unit 82, a management flag storage unit 83, and a request flag storage unit 84.

The coefficient table 81 is a table having stored thereon filter coefficients corresponding to the center frequencies, Q-values, etc., calculated by the coefficient calculating unit 72 for the notch filters 40-1 to **40-*n*. The filter coefficients stored in the coefficient table 81 are read based on the calculation result and set in the coefficient memories 60-1 to 60-*n*. It is assumed that the coefficient table 81** has filter coefficients preliminarily written.

The determination flag storage unit 82 has stored thereon a value of a flag indicating whether the number of times of detection of howling is equal to or greater than n, which is the number of the notch filters, and the value of the determination flag is "0" if the number of times of detection of howling is less than the number of the notch filters and turns to "1" when the number of times of detection of howling becomes equal to or greater than the number of the notch filters. Therefore, when the filter coefficients are set in all the coefficient memories of the notch filters, the value of the determination flag turns to "1".

The management flag storage unit 83 consists of storage memories 90-1 to **90-*n* corresponding to the coefficient memories 60-1 to 60-*n*, respectively, and the respective coefficient memories 90-1 to 90-*n* have stored thereon management flags for managing whether the notch filters 40-1 to 40-*n* are the fixed-coefficient filters or the variable-coefficient filters. In the first embodiment, the storage memory having the value of the management flag of "1" corresponds to the fixed-coefficient filter and the storage memory having the value of the management flag of "0" corresponds to the variable-coefficient filter. The value of the management flag can be stored as either "0" or "1" by default. When the howling suppressing apparatus 20 is activated, for example, the setting unit 73 refers to an external ROM (not shown) to set the value of the management flag in the management flag storage unit 83**.

Figure 4:
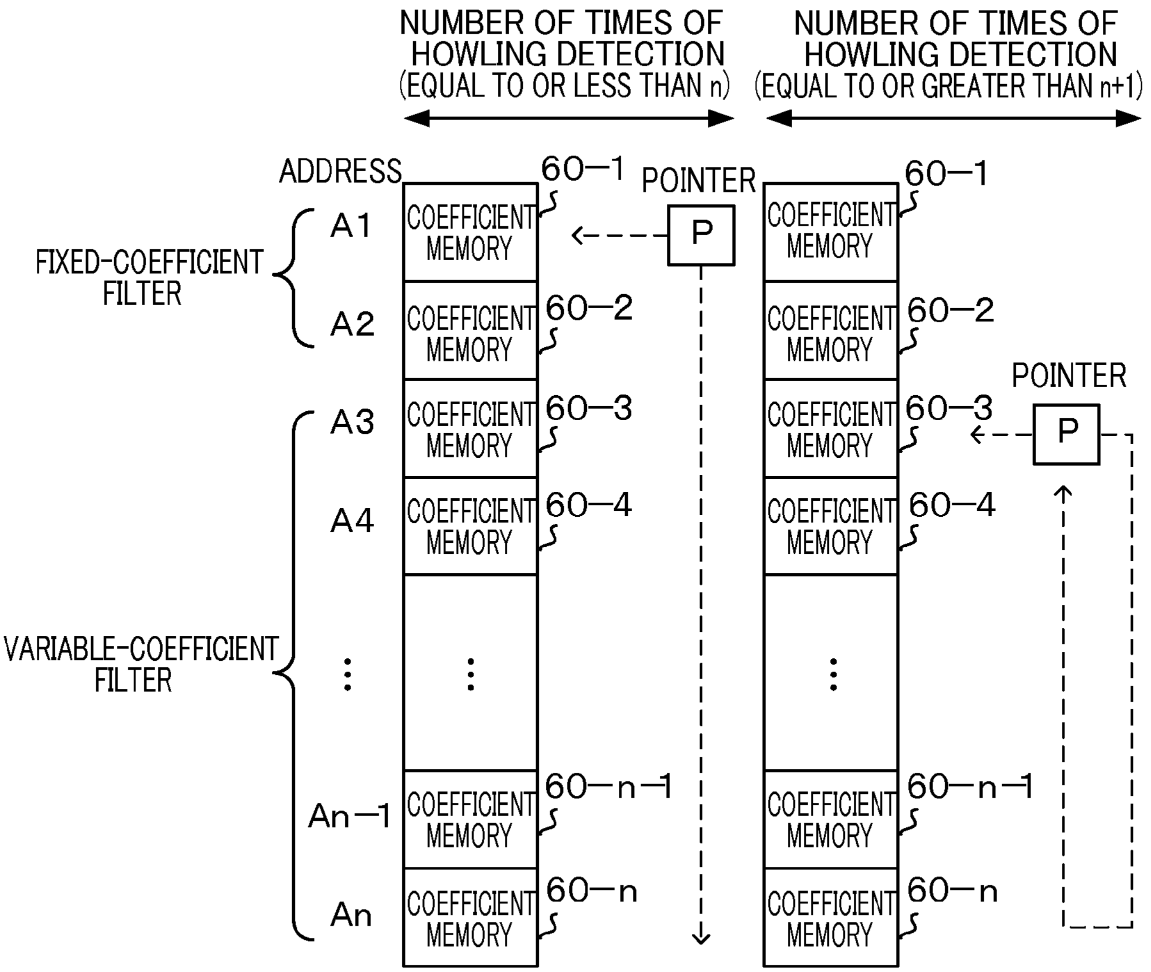
FIG. 4 depicts an example of a process of specifying a coefficient memory.
Figure 5A:
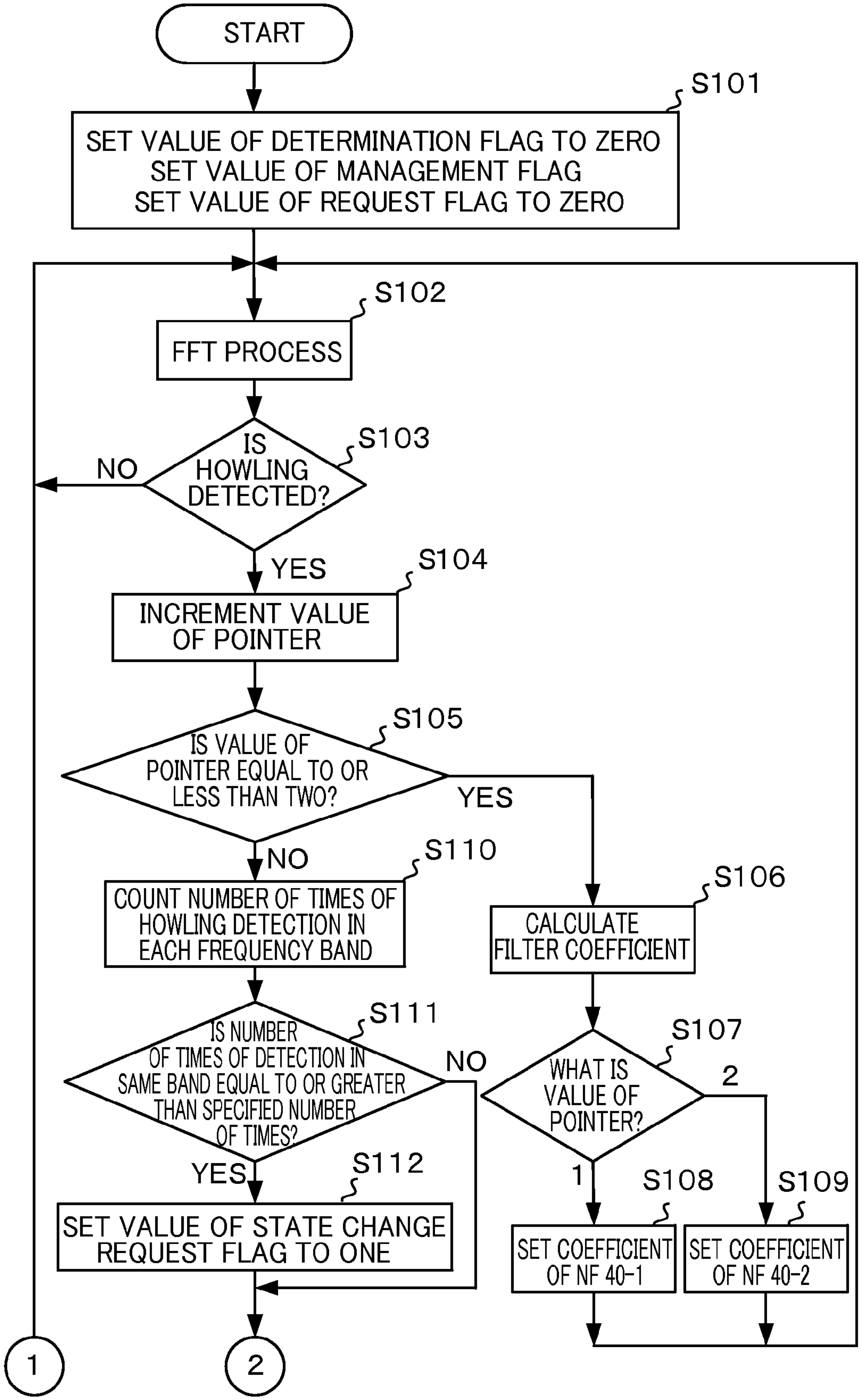
FIG. 5A is a flowchart of an example of the filter coefficient setting process for suppressing the howling.
Figure 5B:
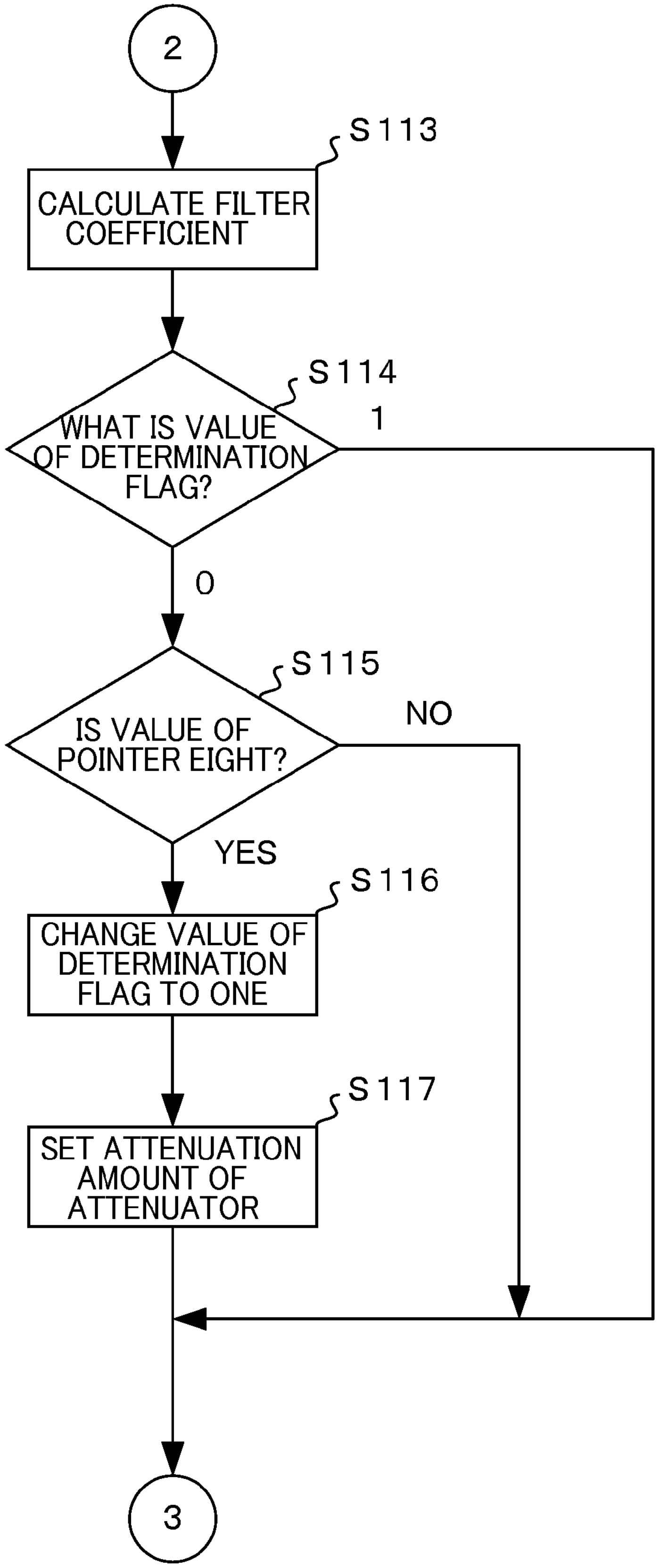
FIG. 5B is a flowchart of an example of the filter coefficient setting process for suppressing the howling.
Figure 5C:
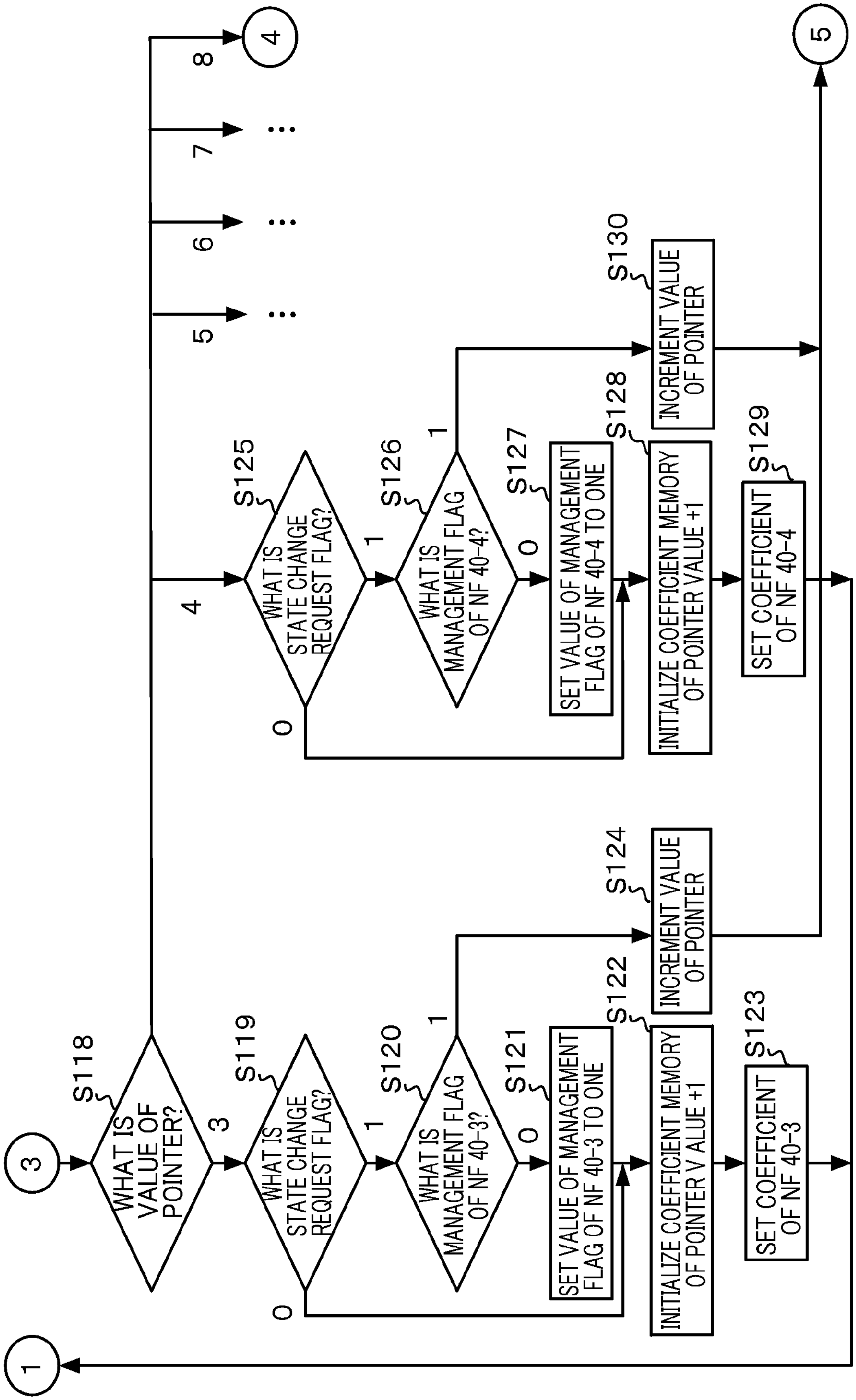
FIG. 5C is a flowchart of an example of the filter coefficient setting process for suppressing the howling.
Figure 5D:
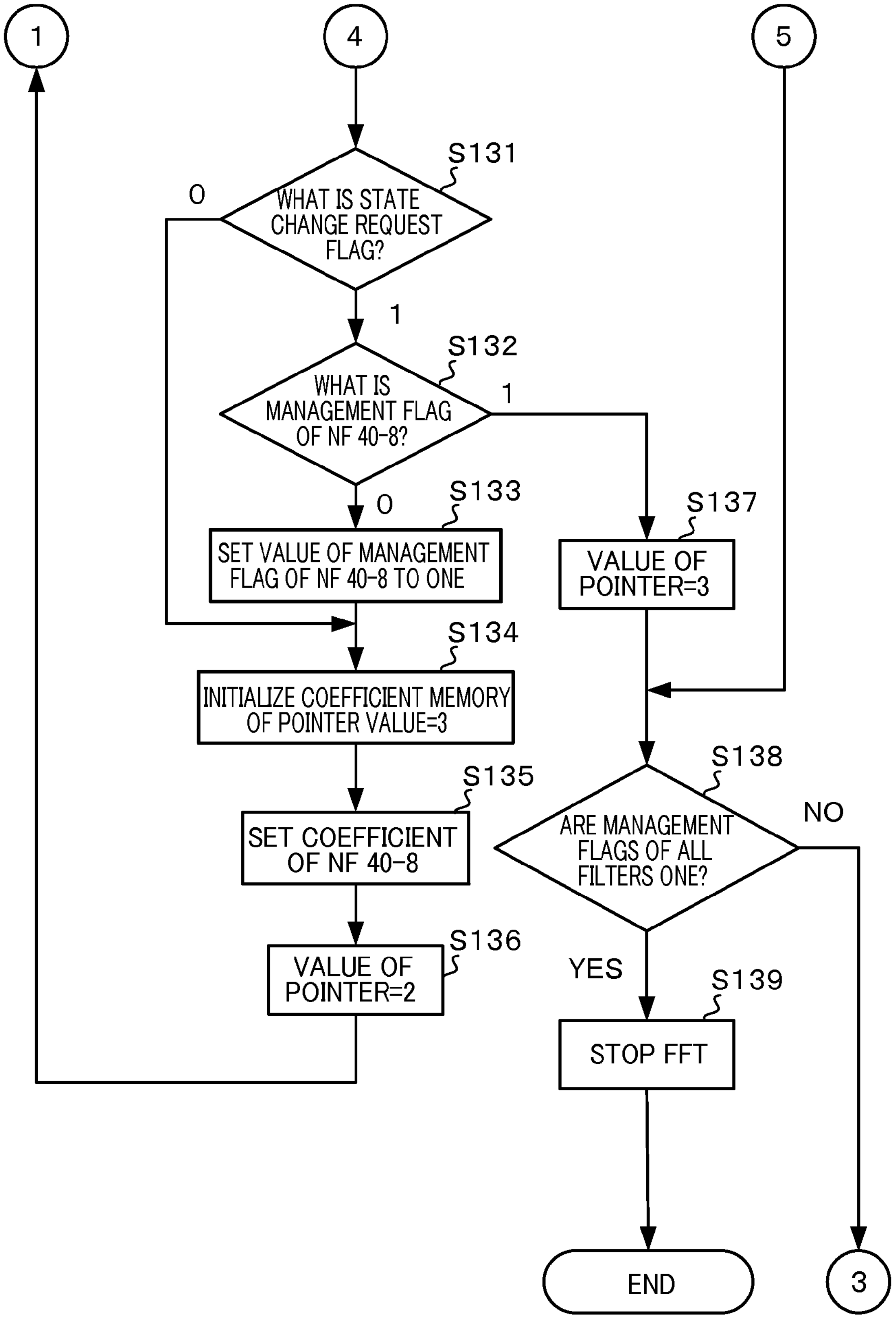
FIG. 5D is a flowchart of an example of the filter coefficient setting process for suppressing the howling.

The pointer update operation in the setting unit 73 will be described for the case that the notch filters 40-1, 40-2 are the fixed-coefficient filters and that the notch filters 40-3 to **40-*n* are the variable-coefficient filters with reference to FIG. 4. If the number of times of detection of howling is equal to or less than the number of the notch filters, when howling is detected, the value of the pointer is incremented, and the coefficient memory 60-1 to 60-*n* based on the value of the pointer is specified. Therefore, regardless of whether the fixed-coefficient filter or the variable-coefficient filter, the filter coefficients for suppressing the howling are sequentially set in the coefficient memories 60-1 to 60-*n*. Description will then be made of the case that the number of times of detection of howling exceeds the number of the notch filters. Since the notch filters 40-1, 40-2 are the fixed-coefficient filters, the setting unit 73 refers to the values of the management flags in the management flag storage unit 83 and excludes the coefficient memories 60-1, 60-2 from the specification of the pointer. Therefore, after the number of times of detection of howling exceeds the number of the notch filters, the coefficient memories 60-3 to 60-*n*** of the variable-coefficient filters are repeatedly specified based on the value of the pointer.

The request flag storage unit 84 is a flag indicating whether a change from the variable-coefficient filter to the fixed-coefficient filter is requested, and the value of the request flag turns to "1" when the change is requested and turns to "0" when the change is not requested. In the first embodiment, if howling is detected in the same band for the number of times equal to or greater than the specified number of times in the howling detection number counter table 80, the value of the request flag is changed from "0" to "1" to suppress the howling in the band with the number of times of detection equal to or greater than the specified number of times.

==Filter Coefficient Setting Process for Suppressing Howling==

A filter coefficient setting process for suppressing howling in the howling suppressing apparatus 20 will then be described with reference to a flowchart of an example of the filter coefficient setting process shown in FIGS. 5A to 5D. In the following description, the number of the notch filters is eight, i.e., n=8; the two notch filters 40-1, 40-2 are the fixed-coefficient filters; and the notch filters 40-3 to 40-8 are the variable-coefficient filters.

When the howling suppressing apparatus 20 is activated, the setting unit 73 sets the value of the determination flag to "0", the value of the management flag of the storage memories 90-1, 90-2 to "1", the value of the management flag of the storage memories 90-3 to 90-8 to "0", and the request flag to "0" (S101). The audio signal input to the howling suppressing apparatus 20 is divided into frequency bands of a total number of i through the FFT process executed by the dividing unit 70 (S102). The detecting unit 71 determines whether howling is detected for each of the i frequency bands divided by the dividing unit 70 (S103), and if howling is not detected (S103: NO), the audio signal input to the howling suppressing apparatus 20 is subjected to the FFT process again by the dividing unit 70 (S102). On the other hand, if the howling is detected (S103: YES), the setting unit 73 increments the value of the pointer (S104). In the first embodiment, it is assumed that the setting unit 73 refers to the value of the pointer to select a process based on the value of the pointer.

<First Operation of the Howling Suppressing Apparatus 20>

In this first operation, description will be made of the case that the value of the pointer is equal to or less than two (S105: YES) after the value of the pointer is incremented (S104), that is, the case that the number of times of detection of howling is equal to or less than the number of the fixed-coefficient filters. First, the coefficient calculating unit 72 calculates the center frequencies, Q-values, etc., for suppressing howling (S106). If the value of the pointer is one (S107: 1), the setting unit 73 reads the filter coefficient corresponding to the calculation result of the coefficient calculating unit 72 from the coefficient table 81 and sets the filter coefficient in the coefficient memory 60-1 for the notch filter 40-1 (S108). If the value of the pointer is two (S107: 2), the filter coefficient for suppressing howling is set in the coefficient memory 60-2 as in the case that the value of the pointer is one (S109). After each filter coefficient is set, the FFT process is executed again (S102).

<Second Operation of the Howling Suppressing Apparatus 20>

In this second operation, description will be made of the case that the value of the pointer is not equal to or less than two (S105: NO) after the value of the pointer is incremented (S104), that is, the case that the number of times of detection of howling exceeds the number of the fixed-coefficient filters. First, since the detecting unit 71 increments the count value of the howling detection number counter table 80 when the howling is detected, the number of times of detection of howling is counted for each frequency band in the howling detection number counter table 80 (S110). The detecting unit 71 compares the count value of each frequency band in the howling detection number counter table 80 with the specified number of times to determine whether the howling is detected in the same band for the number of times equal to or greater than the specified number of times (S111). If the howling is not detected in the same band for the number of times equal to or greater than the specified number of times (S111: NO), the coefficient calculating unit 72 calculates the center frequencies, Q-values, etc., for suppressing howling (S113). The setting unit 73 refers to the value of the determination flag stored in the determination flag storage unit 82 (S114). If the value of the determination flag is "1" (S114: 1), that is, if the filter coefficients are set in all the coefficient memories of the eight notch filters, the setting unit 73 selects the process based on the value of the pointer (S118). If the value of the determination flag is "0" (S114: 0), it is determined whether the value of the pointer is eight (S115). If the value of the pointer is not eight (S115: NO), the process based on the value of the pointer is selected (S118). If the value of the pointer is eight (S115: YES), the setting unit 73 changes the value of the determination flag from "0" to "1" (S116). The setting unit 73 also sets the attenuation amount of the attenuator 31 to reduce the level of the audio signal input to the notch filter 40-1 (S117). The process based on the value of the pointer is then selected (S118).

At step S118, the process corresponding to the value of the pointer is selected. If the value of the pointer is three (S118: 3), the setting unit 73 first refers to the value of the request flag requesting whether the variable-coefficient filter is changed to the fixed-coefficient filter (S119). If the value of the request flag is "0" (S119: 0), the coefficient memory 60-4 is initialized which is a coefficient memory having an address greater by one than the coefficient memory 60-3 specified by the value of the pointer (S122). In the first embodiment, it is assumed that the coefficient memory is driven to the state same as the initial state by the initialization of the coefficient memory. In the first embodiment, the initialization of the coefficient memory is a process for repeatedly setting the filter coefficient for the variable-coefficient filter. The setting unit 73 sets the filter coefficient for suppressing the howling in the coefficient memory 60-3 for the notch filter 40-3 (S123). After the filter coefficient is set in the coefficient memory 60-3, the audio signal input to the howling suppressing apparatus 20 is subjected to the FFT process again by the dividing unit 70 (S102) If the value of the pointer is four (S118: 4), the same process is executed as the case that the value of the pointer is three. Therefore, if the value of the request flag is "0" (S125: 0), the coefficient memory 60-5 is initialized (S128), and the filter coefficient is set in the coefficient memory 60-4 (S129). Subsequently, the FFT process is executed again (S102). In the first embodiment, if the value of the pointer is five to seven (not shown), the same process is also executed as the case that the value of the pointer is three or four. If the value of the pointer is eight (S118: 8), when the request flag indicating whether the variable-coefficient filter is changed is "0" (S131: 0), the coefficient memory 60-3 is initialized (S134), and the filter coefficient is set in the coefficient memory 60-8 (S135). To specify the initialized coefficient memory 60-3, the setting unit 73 changes the value of the pointer from eight to two (S136) and returns to the FFT process (S102). When howling is subsequently detected (S103), the pointer is incremented (S104) and, therefore, the value of the pointer becomes three as a result. Therefore, in the second operation, any one of the coefficient memories 60-3 to 60-8 is specified by the setting unit 73 based on the value of the pointer.

<Third Operation of the Howling Suppressing Apparatus 20>

In this third operation, description will be made of the case that the value of the pointer is not equal to or less than two (S105: NO) and that the howling is detected in the same band for the number of times equal to or greater than the specified number of times (S111: YES) after the specified number of times of the howling is counted for each frequency band (S110). Since the specified number of times is greater than the number of the notch filters in the first embodiment, the value of the determination flag is "1" in the third operation. First, when the howling is detected in the same band for the number of times equal to or greater than the specified number of times, the value of the requesting flag requesting a change from the variable-coefficient filter to the fixed-coefficient filter is changed from "0" to "1" (S112). The center frequencies, Q-values, etc., for suppressing howling are calculated (S113), and since the value of the determination flag is "1" (S114: 1), a process is selected based on the value of the pointer (S118). If the value of the pointer is three, since the value of the request flag is "1" (S119: 1), a reference is made to the management flag of the storage memory 90-3 for managing the state of the notch filter 40-3 (S120). If the management flag is "0", the value of the management flag of the storage memory 90-3 is changed from "0" to "1" (S121). After the above, steps S122 and S123 are executed and the flow goes back to the FFT process (S102). On the other hand, if the management flag of the storage memory 90-3 is "1" (S120: 1), that is, the notch filter 40-3 is already changed from the variable-coefficient filter to the fixed-coefficient filter, the value of the pointer is incremented (S124), and the management flags stored in all the storage memories 90-1 to 90-8 are referenced to check whether all the management flags are "1" (S138) In the first embodiment, if the value of the pointer is four (S125 to S130) and the value of the pointer is five to seven (not shown), the same process is executed as the case that the value of the pointer is three. If the value of the pointer is eight (S118: 8), since the value of the request flag is "1" (S131: 1), a reference is made to the management flag of the storage memory 90-8 (S132). If the management flag is "0" (S132: 0), the value of the management flag of the storage memory 90-8 is changed to "1" (S133) and, after the above steps S134 to S136 are executed, the flow goes back to the FFT process (S102). If the value of the management flag of the storage memory 90-8 is "1" (S132: 1), the value of the pointer is changed to three (S137), and the management flags stored in all the storage memories 90-1 to 90-8 are referenced to check whether all the management flags are "1" (S138).

If the management flags are not all "1" in the storage memories (S138: NO), that is, if any variable-coefficient filter is not changed to the fixed-coefficient filter, a process based on the value of the pointer is selected to specify the variable-coefficient filter with the pointer (S118). If the values of the management flags of all the storage memories are "1" (S138: YES), that is, if all the notch filters are changed to the fixed-coefficient filters, the FFT process is stopped (S139) and the process of setting the filter coefficient is terminated. In the above third operation, if howling is detected in the same band for the number of times equal to or greater than the specified number of times (S111: YES), the variable-coefficient filters are changed to the fixed-coefficient filters to suppress the howling detected for the number of times equal to or greater than the specified number of times (e.g., S121). The pointer excludes the changed fixed-coefficient filters from the specification (e.g., S124) and selects only the variable-coefficient filters to set the filter coefficients. When all the variable-coefficient filters are eventually changed to the fixed-coefficient filters (S138: YES), the FFT process is stopped (S139) and the filter coefficient setting process is terminated.

Figure 6:
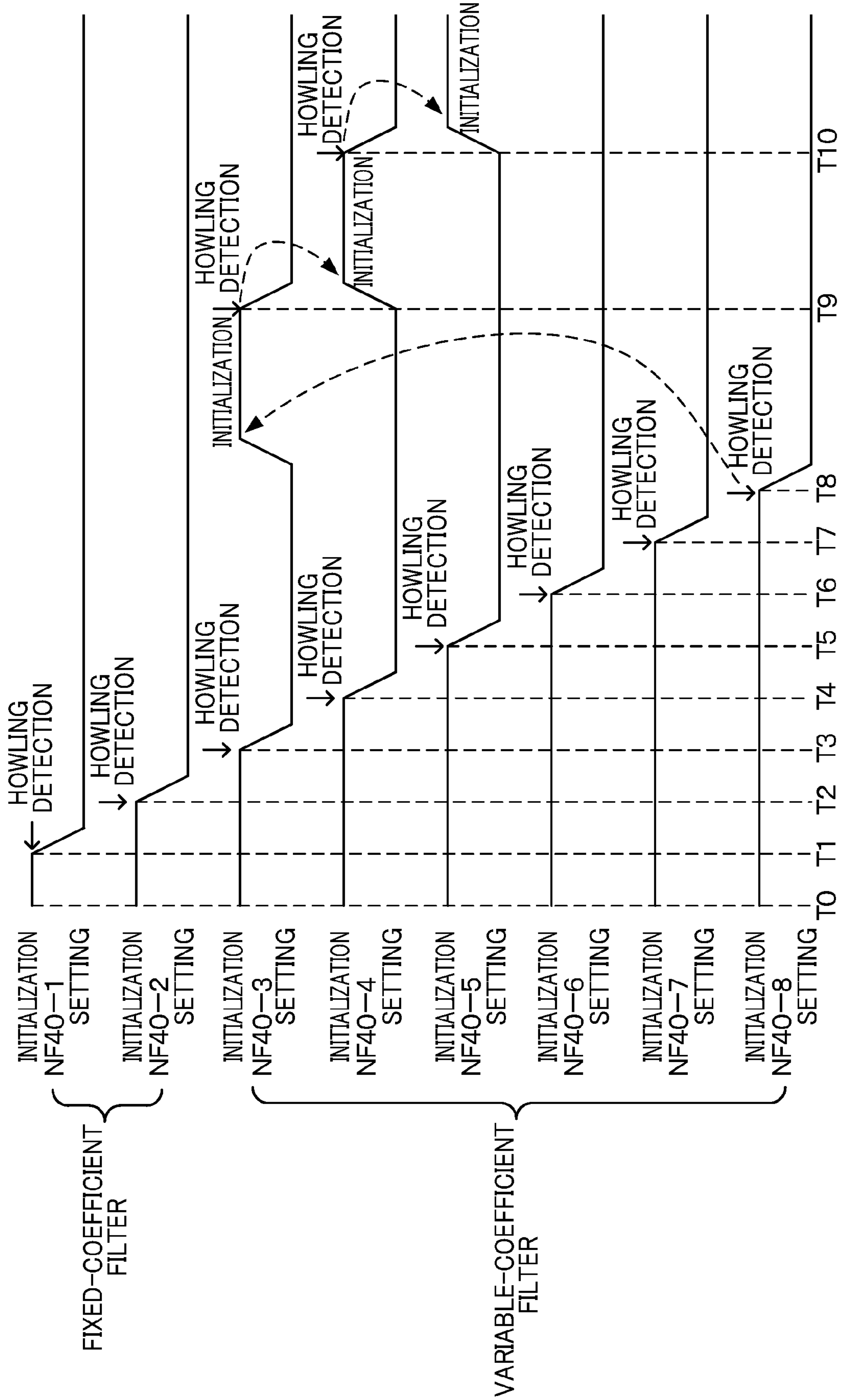
FIG. 6 is a timing chart for a unit of a specific example of the process of FIGS. 5A to 5D.

FIG. 6 is an example of a timing chart for a unit of a specific example of the process shown in FIGS. 5A to 5D. As is the case described in FIGS. 5A to 5D, the number of the notch filters is eight; the notch filters 40-1, 40-2 are the fixed-coefficient filters; and the notch filters 40-3 to 40-8 are the variable-coefficient filters by default.

First, the howling suppressing apparatus 20 is activated at time T0. When howling is detected at time T1 (S103), the value of the pointer is incremented to one (S104); the filter coefficient for suppressing the howling is calculated (S106); and the filter coefficient based on the calculation result is set in the coefficient memory 60-1 for the notch filter 40-1 (S108). When the howling is detected for a total of six times from time T2 to time T7, the pointer is incremented each time by one (S104) and the filter coefficients for suppressing the howling are sequentially set in the filter coefficients 60-2 to 60-7 (S109, S123, S129). When the howling is detected at time T8 (S103), the value of the pointer turns to eight (S104); the value of the determination flag turns to "1" (S116); and the attenuation amount of the attenuator 31 is set (S117). The coefficient memory 60-3 for the pointer value of three is initialized (S134), and the filter coefficient for suppressing the howling is set in the coefficient memory 60-8 of the notch filter 40-8 (S135). The value of the pointer is changed to two (S136). When the howling is detected at time T9 (S103), the value of the pointer is incremented to three (S104); the coefficient memory 60-4 for the pointer value of four is initialized (S122), and the filter coefficient for suppressing the howling is set in the coefficient memory 60-3 of the notch filter 40-3 (S123). As is the case with the operation at time T9, the howling detected after time T10 and time T10 is suppressed by setting the filter coefficient in the coefficient memory specified by the pointer.

Second Embodiment

Figure 7:
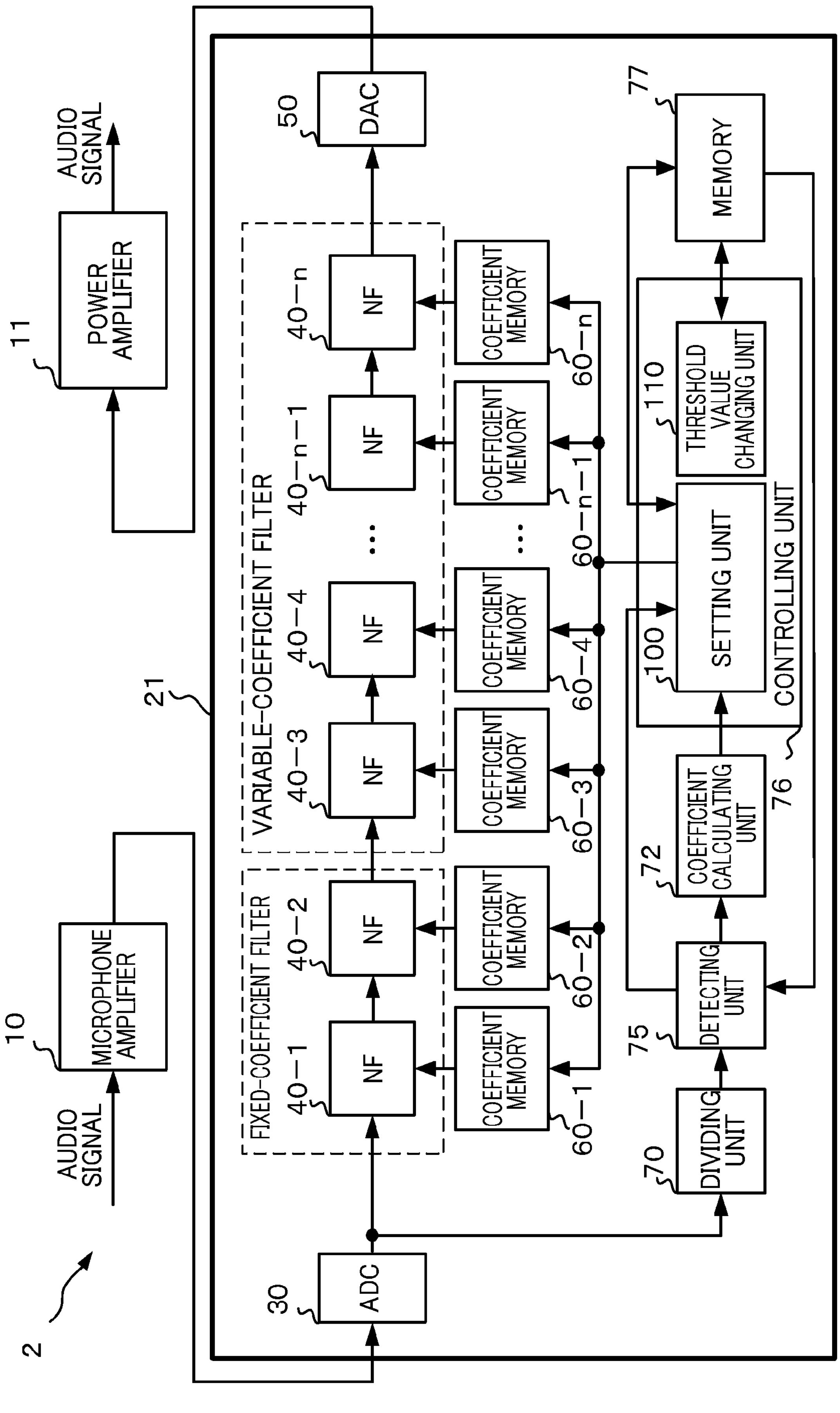
FIG. 7 depicts a second embodiment of an audio apparatus to which the present invention is applied.

FIG. 7 depicts a second embodiment of an audio apparatus to which the present invention is applied. An audio apparatus 2 shown in FIG. 7 is an apparatus that amplifies and outputs audio signals input from a microphone (not shown) etc., to a speaker (not shown) etc., while suppressing the howling and includes the microphone amplifier 10, the power amplifier 11, and a howling suppressing apparatus 21. The microphone amplifier 10 and the power amplifier 11 are the same as the microphone amplifier 10 and the power amplifier 11 of the first embodiment.

The howling suppressing apparatus 21 is an apparatus that suppresses the howling of the audio signal output from the microphone amplifier 10 to output the signal to the power amplifier 11 and includes the AD convertor (ADC) 30, the notch filters (NF) 40-1 to 40-*n*, the DA convertor (DAC) 50, the coefficient memories 60-1 to 60-*n*, the dividing unit 70, the coefficient calculating unit 72, a detecting unit 75, a controlling unit 76, and a memory 77. For example, a DSP (digital signal processor) including an AD converter and a DA converter can be employed for the howling suppressing apparatus 21 of the second embodiment. The AD convertor 30, the notch filters (NF) 40-1 to **40-*n*, the DA convertor (DAC) 50, the coefficient memories 60-1 to 60-*n*, the dividing unit 70, the coefficient calculating unit 72 of the second embodiment are the same as the AD convertor 30, the notch filters (NF) 40-1 to 40-*n*, the DA convertor (DAC) 50, the coefficient memories 60-1 to 60-*n*, the dividing unit 70, the coefficient calculating unit 72** of the first embodiment, respectively.

The detecting unit 75 compares the peak level of the audio signal in each frequency band divided by the dividing unit 70 with a threshold value of a predetermined level and detects howling by determining that howling occurs if the peak level of the audio signal exceeds the threshold value of the predetermined level. In the second embodiment, the threshold value is set by reference to a threshold value storage unit 86 in the memory 77.

The controlling unit 76 includes a setting unit 100 and a threshold value changing unit 110 and refers to the detection result of the detecting unit 75, the calculation result of the coefficient calculating unit 72, and various data stored in the memory 77 to control the howling suppressing apparatus 21.

The setting unit 100 sets the filter coefficients for suppressing the howling in the coefficient memories 60-1 to **60-*n* based on the detection result of the detecting unit 75 and writes various data into a writable area of the memory 77. The setting unit 100 of the second embodiment is provided with a pointer for addressing of the coefficient memories 60-1 to 60-*n*, and the filter coefficient is set in the coefficient memory addressed by the pointer. The addressing of the coefficient memories 60-1 to 60-*n* is performed by a decoder (not shown) that decodes the value of the pointer provided in the setting unit 100, for example. In the second embodiment, it is assumed that the value of the pointer is zero by default and that the setting unit 100 increments the value of the pointer by one when the detecting unit 75** detects howling.

The threshold value changing unit 110 changes the setting of the threshold value storage unit 86 of the memory 77 such that the threshold value of the detecting unit 75 is increased based on a value of a determination flag of a determination flag storage unit 87 provided in the memory 77. In the second embodiment, an initial threshold value is a threshold value before the level is increased when the howling suppressing apparatus is activated.

Figure 8:
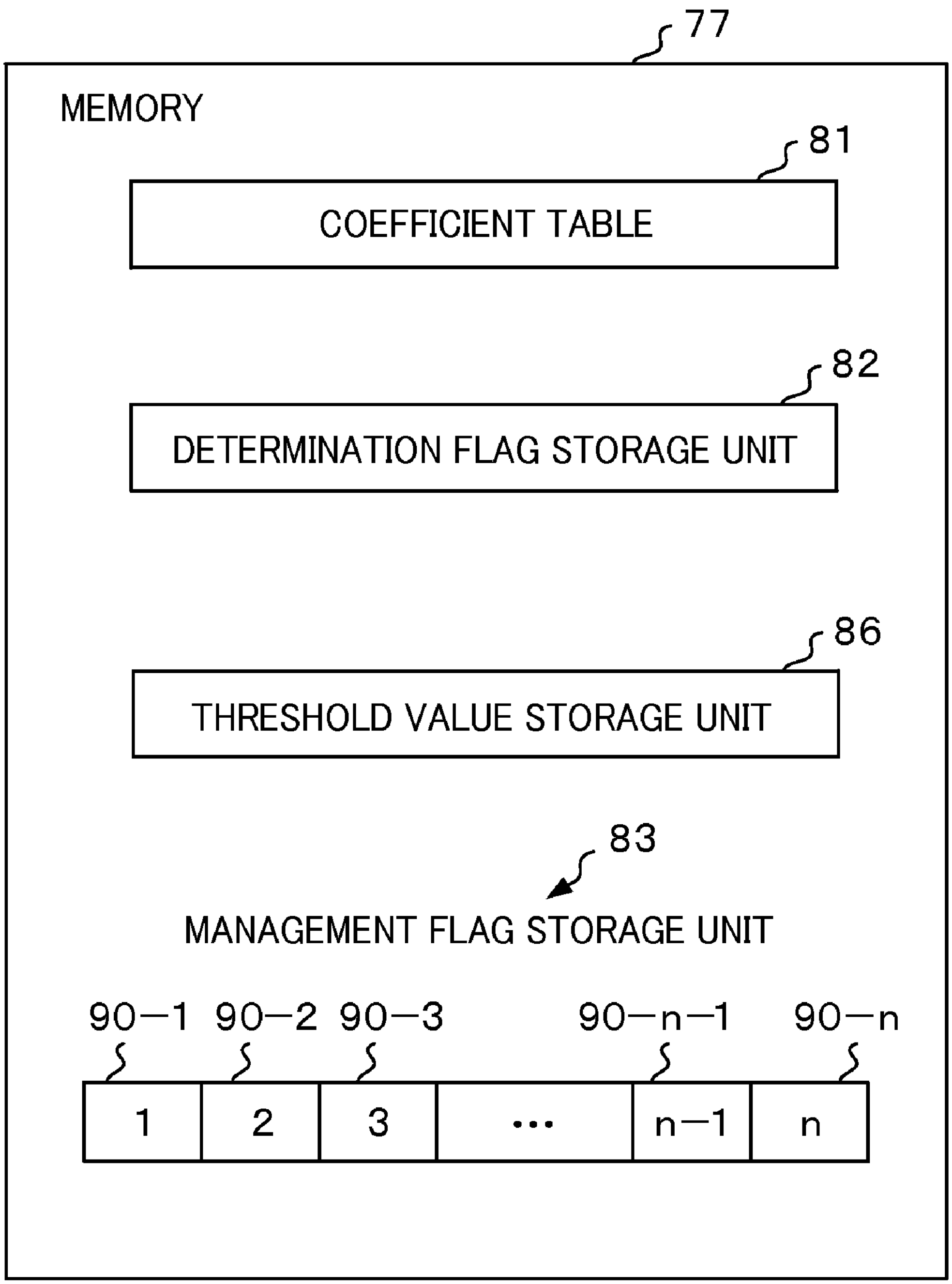
FIG. 8 depicts an example of a storage unit included in a memory 77.

The memory 77 has stored thereon various data necessary for controlling the howling suppressing apparatus 21 of the second embodiment and has a writable area for the setting unit 100. FIG. 8 depicts a part of the storage unit included in the memory 77. The memory 77 of the second embodiment includes a ROM and a RAM; the storage area of the ROM is provided with the coefficient table 81; and the storage area of the RAM is provided with the determination flag storage unit 82, the management flag storage unit 83, and the threshold value storage unit 86. The coefficient table 81, the determination flag storage unit 82, and the management flag storage unit 83 of the second embodiment are the same as the coefficient table 81, the determination flag storage unit 82, and the management flag storage unit 83 of the first embodiment. It is assumed that the setting unit 100 of the second embodiment sets the value of the management flag in a management flag storage unit 83 with reference to, for example, an external ROM (not shown) when the howling suppressing apparatus 21 is activated.

The threshold value storage unit 86 has a threshold value as a threshold value control signal for controlling the threshold value in the detecting unit 75. In the second embodiment, it is assumed that the setting unit 100 sets an initial threshold value in the threshold value storage unit 86 by reference to, for example, an external ROM (not shown) when the howling suppressing apparatus 21 is activated. The threshold value stored in the threshold value storage unit 86 is changed by the threshold value changing unit 110 at predetermined timing. Although the threshold value control signal is directly used as the threshold value in the second embodiment, the threshold value control signal is not limited to the threshold value and may be any signal capable of controlling the threshold value. For example, the threshold value storage unit 86 may have stored thereon as the threshold value control signal: an initial threshold value; a threshold value greater than the initial threshold value; and a selection signal indicating which one of these two threshold values is selected as the threshold value. In this case, the threshold value of the detecting unit 75 can be changed by changing the selection signal stored in the threshold value storage unit 86.

If the notch filters 40-1, 40-2 are the fixed-coefficient filters and the notch filters 40-3 to **40-*n* are the variable-coefficient filters, the pointer update operation in the setting unit 100** is the same as the first embodiment.

==Filter Coefficient Setting Process for Suppressing Howling==

Figure 9A:
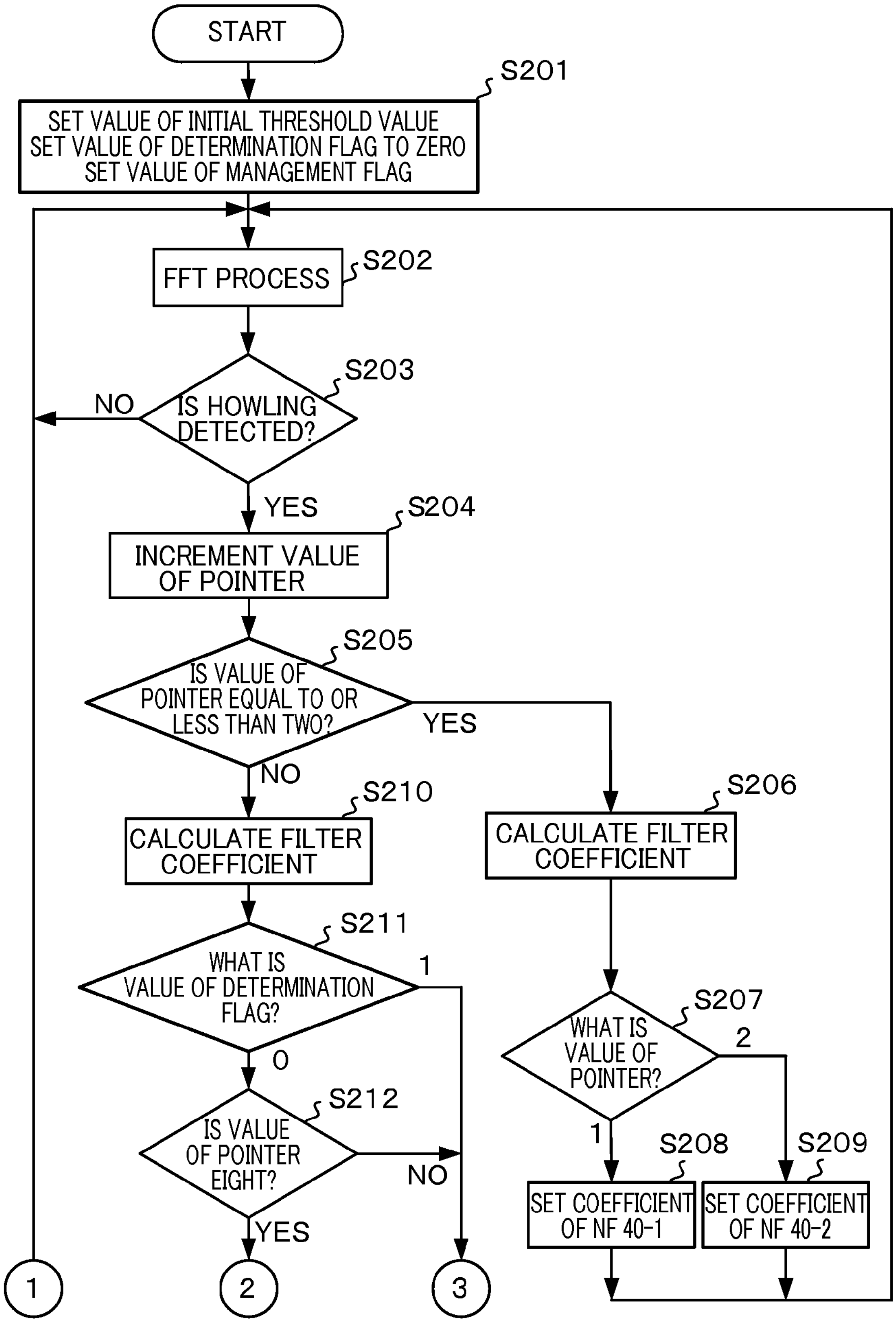
FIG. 9A is a flowchart of an example of the filter coefficient setting process for suppressing the howling.
Figure 9B:
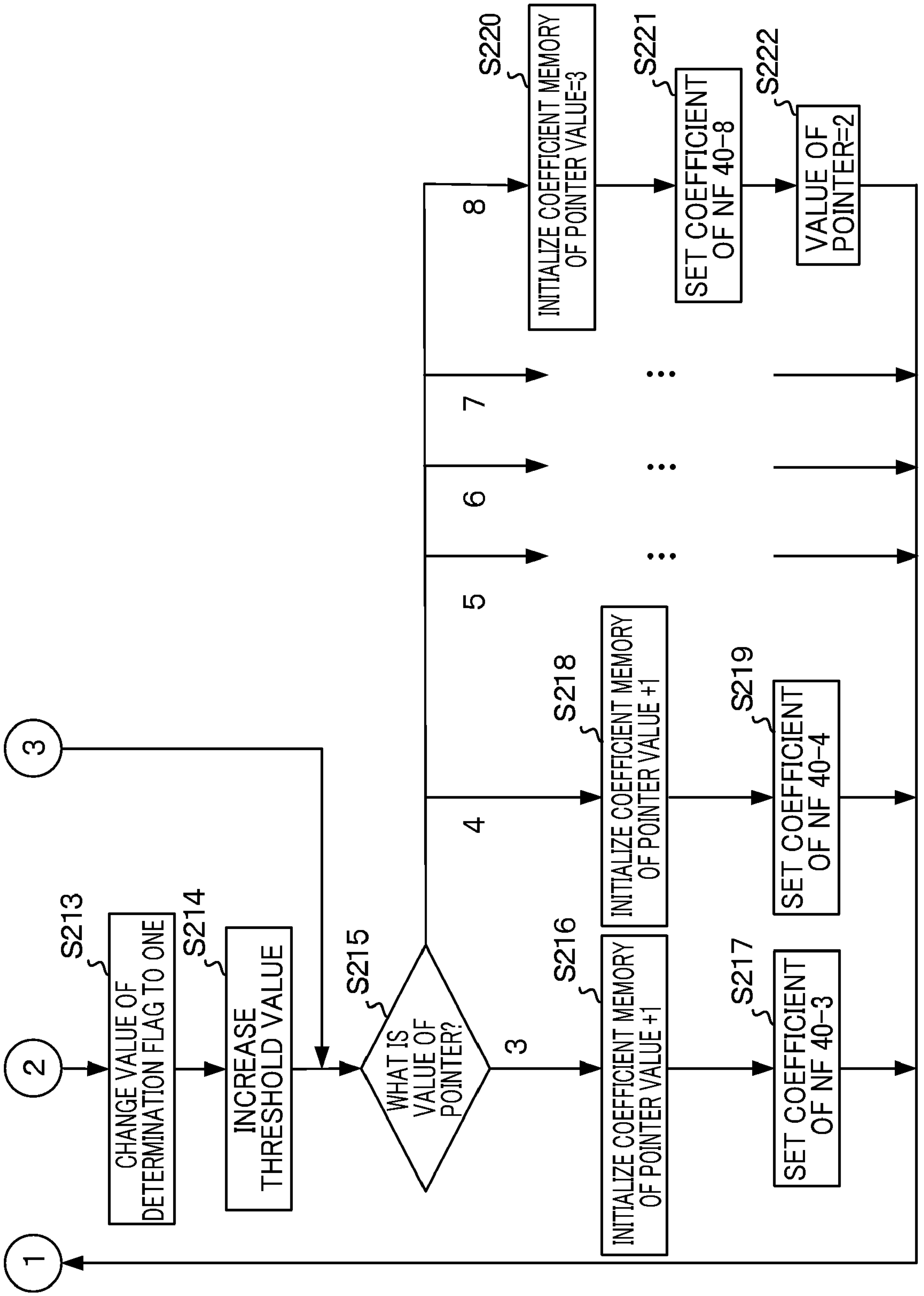
FIG. 9B is a flowchart of an example of the filter coefficient setting process for suppressing the howling.

A filter coefficient setting process for suppressing howling in the howling suppressing apparatus 21 will then be described with reference to a flowchart of an example of the filter coefficient setting process shown in FIGS. 9A and 9B. In the following description, the number of the notch filters is eight, i.e., n=8; the two notch filters 40-1, 40-2 are the fixed-coefficient filters; and the notch filters 40-3 to 40-8 are the variable-coefficient filters.

When the howling suppressing apparatus 21 is activated, the setting unit 100 sets the initial threshold value in the threshold value storage unit 86, the value of the determination flag to "0", the value of the management flag of the storage memories 90-1, 90-2 to "1", and the value of the management flag of the storage memories 90-3 to 90-8 to "0" (S201). In the second embodiment, the process in the case of the value of the pointer equal to or greater than two (S205: NO) when the value of the pointer is incremented (S204), that is, the process from S201 to S209 is the same as the process from S101 to S109 of the first embodiment. Therefore, in the second embodiment, description will be made of the case that the value of the pointer is not equal to or less than two (S205: NO) after the value of the pointer is incremented (S204), that is, the case that the number of times of detection of howling exceeds the number of the fixed-coefficient filters.

<Operation of Howling Suppressing Apparatus 21>

First, the coefficient calculating unit 72 calculates the center frequencies, Q-values, etc., for suppressing howling (S210). The setting unit 100 refers to the value of the determination flag stored in the determination flag storage unit 82 (S211). If the value of the determination flag is "1" (S211: 1), that is, if the filter coefficients are set in all the coefficient memories of the eight notch filters, the setting unit 100 selects the process based on the value of the pointer (S215). If the value of the determination flag is "0" (S211: 0), it is determined whether the value of the pointer is eight (S212). If the value of the pointer is not eight (S212: NO), the process based on the value of the pointer is selected (S215). If the value of the pointer is eight (S212: YES), the setting unit 100 changes the value of the determination flag from "0" to "1" (S213). The threshold value changing unit 110 refers to the value of the determination flag of the determination flag storage unit 82 and increases the threshold value of the threshold value storage unit 86 (S214). The process based on the value of the pointer is then selected (S215). At step S215, the process corresponding to the value of the pointer is selected.

If the value of the pointer is three (S215: 3), the setting unit 100 first initializes the coefficient memory 60-4 which is a coefficient memory having an address greater by one than the coefficient memory 60-3 specified by the value of the pointer (S216). In the second embodiment, it is assumed that the coefficient memory is driven to the same state as the initial state by the initialization of the coefficient memory. In the second embodiment, the initialization of the coefficient memory is a process for repeatedly setting the filter coefficient for the variable-coefficient filter. The setting unit 100 sets the filter coefficient for suppressing the howling in the coefficient memory 60-3 for the notch filter 40-3 (S217). After the filter coefficient is set in the coefficient memory 60-3, the audio signal input to the howling suppressing apparatus 21 is subjected to the FFT process again by the dividing unit 70 (S202). If the value of the pointer is four (S215: 4), the same process is executed as the case that the value of the pointer is three. Therefore, the coefficient memory 60-5 is initialized (S218), and the filter coefficient is set in the coefficient memory 60-4 (S219). Subsequently, the FFT process is executed again (S202). In the second embodiment, if the value of the pointer is five to seven (not shown), the same process is also executed as the case that the value of the pointer is three or four.

If the value of the pointer is eight (S215: 8), i.e., if the value of the pointer is equal to the number of the notch filters, the setting unit 100 refers to the management flag storage unit 83 and initializes the coefficient memory 60-3 having the smallest address among the coefficient memories of the variable-coefficient filters to suppress howling further detected (S220). The filter coefficient is set in the coefficient memory 60-8 for the notch filter 40-8 (S221). To specify the initialized coefficient memory 60-3, the setting unit 100 changes the value of the pointer from eight to two (S222) and returns to the FFT process (S202). When howling is subsequently detected (S203), the pointer is incremented (S204) and, therefore, the value of the pointer becomes three as a result. Therefore, in the second operation, any one of the coefficient memories 60-3 to 60-8 is specified by the setting unit 100 based on the value of the pointer.

Figure 10:
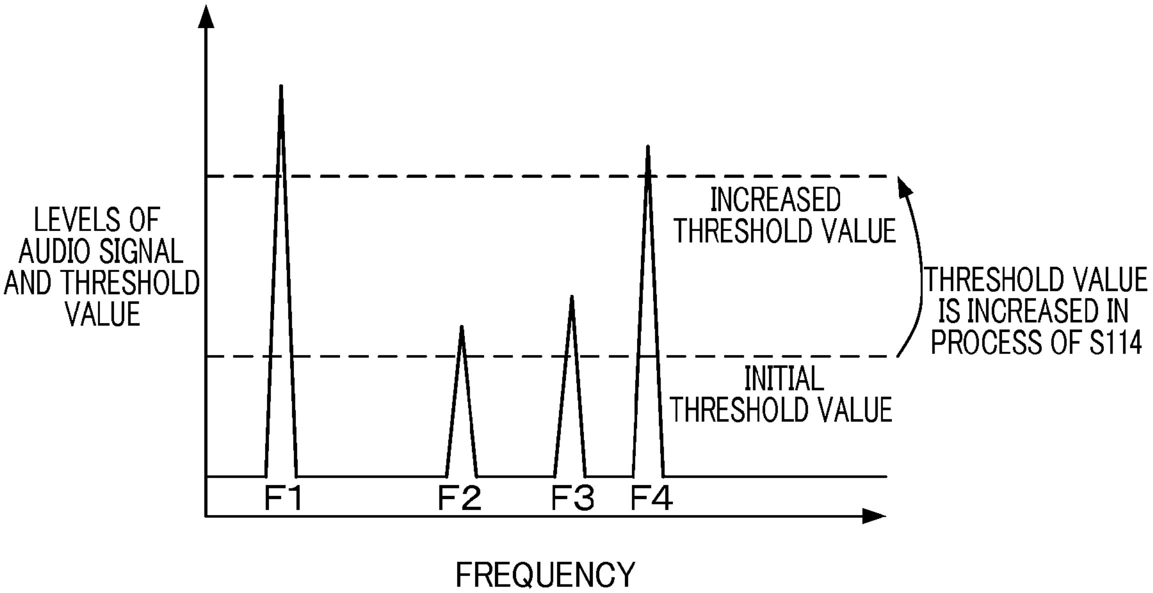
FIG. 10 is an exemplary view of howling detection in a detecting unit 71.
Figure 11:
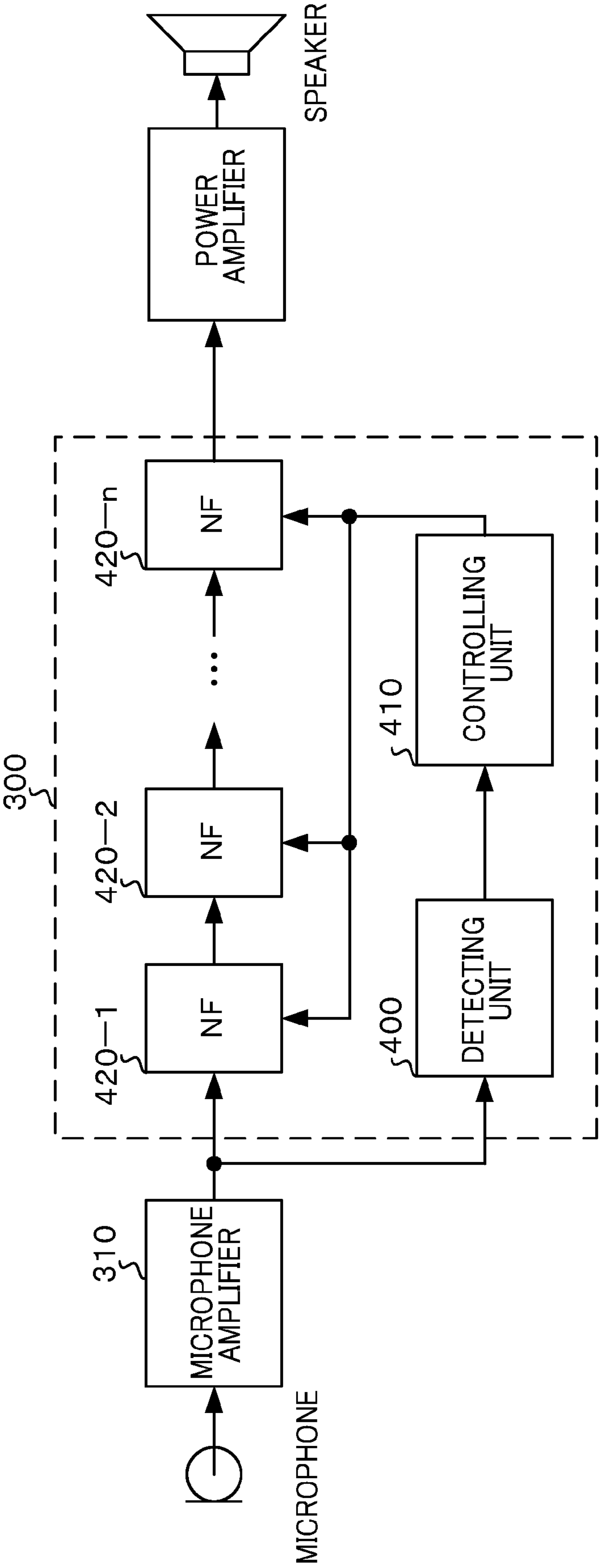
FIG. 11 depicts an example of a typical howling suppressing apparatus.

FIG. 10 is an exemplary view of the howling detection in the detecting unit 75. FIG. 10 is an example of the case that the FFT process (S202) is executed for the first time after the howling suppressing apparatus 21 is activated. As above, the detecting unit 75 compares the level of the audio signal with the level of the initial threshold value for each frequency band (S203) Since the level of the audio signal in frequency bands F1, F2, F3, and F4 is greater than the level of the initial threshold value in FIG. 10, the audio signal in the frequency bands F1 to F4 is detected as howling. Therefore, the filter coefficients for suppressing the detected howling are set in the coefficient memories 60-1 to 60-4 (S208, S209, S217, S219). If the howling is further detected (not shown) and the value of the pointer becomes eight which is equal to the number of the notch filters, the level of the threshold value is increased (S214) as shown in FIG. 10 and the above process is continued. Since the level of the threshold value is increased as above, the howling detection time can be shortened because the howling in the frequency bands F2, F3 can be detected temporally faster as compared to the case that a threshold value after the increase in level has been set after the activation, for example. Since the level of the threshold value is increased when the howling is detected eight times, a probability of error detection can be reduced as compared to the case that the threshold value is not increased, for example.

In the howling suppressing apparatus 20 of the first embodiment constituted by the constituent elements described above, the filter coefficient for suppressing the detected howling is set for any one of the coefficient memories 60-3 to 60-8 selected by the pointer for the howling detected for the number of times greater than the number of the notch filters. Therefore, the howling can be suppressed when the howling is detected for the number of times greater than the number of the notch filters.

The generally occurring howling is broadly classified into characteristic howling generated depending on indoor space and uncertain howling generated depending on a positional relationship between the microphone and the speaker of the acoustic apparatus 1, the sound volume set for the speaker, etc. The characteristic howling has a higher probability of occurrence during the operation of the audio apparatus 1 and tends to occur in advance as compared to the uncertain howling. Therefore, it is desirable that the howling detected in advance is always suppressed while the audio apparatus 1 is operated. In the howling suppressing apparatus 20 of the first embodiment, the filter coefficients for suppressing the howling detected in advance are sequentially set from the fixed-coefficient filters (S108, S109). Since the filter coefficients set in the fixed-coefficient filters are not changed, the howling suppressing apparatus 20 of the first embodiment can suppress the howling detected for the number of times greater than the number of the notch filters and can reduce the probability of occurrence of howling.

The variable-coefficient filter of the howling suppressing apparatus 20 of the first embodiment is repeatedly initialized for suppressing the detected howling and the filter coefficient is set. Therefore, when the filter coefficient is repeatedly set, the howling such as characteristic howling generated in the same frequency band may be detected many times. In the first embodiment, when the howling is detected in the same band for the number of times equal to or greater than the specified number of times (S111: YES), a change to the fixed-coefficient filter is made from the variable-coefficient filter having the filter coefficient set for suppressing the howling detected in the same band for the number of times equal to or greater than the specified number of times (e.g., S121). Therefore, the howling suppressing apparatus 20 of the first embodiment can suppress the howling detected for the number of times greater than the number of the notch filters and can reduce the probability of occurrence of howling.

Since the howling is generated because the audio signal output from the speaker is fed back to the microphone, the probability of occurrence of howling can be reduced by attenuating the level of the audio signal with the attenuator 31, for example, by about 2 dB causing no effect on the auditory perception, when the howling is detected.

In the first embodiment, the coefficient memory having the filter coefficient set is initialized to suppress the howling detected for the number of times greater than the number of the notch filters. Therefore, the suppressed howling may occur again if the initialization is executed, however the probability of occurrence of the suppressed howling can be reduced by attenuating the level of the audio signal with the attenuator 31, for example, by about 2 dB causing no effect on the auditory perception, at the timing when the filter coefficients are set in all the coefficient memories of the notch filters (S117).

In the howling suppressing apparatus 21 of the second embodiment consisting of the constituent elements described above, a low-level initial threshold value is set in the detecting unit 75 at the time of activation, and the level of the threshold value is increased at a predetermined timing. The generally occurring howling is broadly classified into characteristic howling generated depending on the disposition environment of the audio apparatus 2 and uncertain howling generated depending on a positional relationship between the microphone and the speaker of the audio apparatus 2, the sound volume set for the speaker, etc. The characteristic howling has a higher probability of occurrence and tends to occur in advance as compared to the uncertain howling. Therefore, the howling suppressing apparatus 21 of the second embodiment is likely to be able to detect the characteristic howling occurring in advance in general and can reduce the howling detection time. Since the level of the threshold value is increased at a predetermined timing after the howling suppressing apparatus 21 is activated, a probability of error detection of howling can be reduced after the threshold value is increased.

In the howling suppressing apparatus 21 of the second embodiment, the threshold value is increased at the timing when the howling is detected eight times. Therefore, by increasing the threshold value after the howling is detected at least once, the threshold value can be prevented from being increased when howling is not yet generated.

In the howling suppressing apparatus 21 of the second embodiment, the threshold value is increased at the timing when the howling is detected eight times which correspond to the number of the notch filters. For the howling detected for the number of times greater than the number of the notch filters, the filter coefficient for suppressing the detected howling is set in any one of the coefficient memories 60-3 to 60-8 specified by the pointer. Therefore, the howling suppressing apparatus 21 of the second embodiment can suppress the howling detected for the number of times greater than the number of the notch filters.

In the howling suppressing apparatus 21 of the second embodiment, the threshold value is increased at the timing when the howling is detected eight times which correspond to the number of the notch filters, and the notch filters 40-1, 40-2 are the fixed-coefficient filters. Therefore, the filter coefficients for suppressing the howling detected in advance are first set in the fixed-coefficient filters. The howling suppressing apparatus 21 of the second embodiment does not change the filter coefficient set in the fixed-coefficient filter when suppressing the howling detected for the number of times greater than the number of the notch filters. Since the howling detected in advance is likely to be the characteristic howling, and the fixed-coefficient filters is likely to suppress the characteristic howling having a higher probability of occurrence. Therefore, the probability of occurrence of howling can be reduced.

The above embodiments of the present invention are simply for facilitating the understanding of the present invention and are not in any way to be construed as limiting the present invention. The present invention may variously be changed or altered without departing from its spirit and encompass equivalents thereof.

For example, although the pointer sets addresses for the coefficient memories of the variable-coefficient filters in the order of address values in the first embodiment, the setting may be performed in random order. Although the filter coefficient is initialized in the first embodiment, the filter coefficient may be overwritten without initialization. Although the attenuator 31 is located before the notch filter 40-1, the attenuator 31 may be located between the notch filter **40-*n* and the DAC 50, for example. Although the level of the audio signal is attenuated by the attenuator 31, the level of the audio signal may be reduced by reducing the gain of the microphone amplifier 10 or the power amplifier 11**, for example.

For example, although the notch filters include the variable-coefficient filters and the fixed-coefficient filters in the description of the second embodiment, the notch filters may include only the variable-coefficient filters. In this case, the timing of increasing the threshold value is defined as being in a time period after the howling is detected at least once until the howling is detected for the number of times of the notch filters. As a result, the threshold value can be prevented from being increased when howling is not yet generated, and since at least one of the notch filters can suppress the howling detected with a higher threshold value, the howling detection time can be shortened and a probability of error detection can be reduced.

Although the level of the threshold value is increased by, for example, detecting the howling in the second embodiment, the threshold value changing unit 110 may be configured to refer to the output of a timer circuit (not shown) that counts a certain time to increase the level of the threshold value after the certain time has elapsed.

What is claimed is:

1. A howling suppressing apparatus comprising:

a detecting unit configured to detect howling of input audio signals;

a plurality of filters configured to apply a filter process sequentially to the audio signals to be output; and a setting unit configured to when a respective filter coefficient has not yet been set in all of the plurality of filters, select a filter in which the filter coefficient has not yet been set from the plurality of filters and set the filter coefficient in the selected filter for suppressing the howling detected by the detecting unit, and when the respective filter coefficient has been set in all of the plurality of filters, select a filter in which the filter coefficient was previously set from the plurality of filters and set the filter coefficient in the selected filter for suppressing the howling detected by the detecting unit.

2. The howling suppressing apparatus of claim 1, wherein one or more filter of the plurality of filters has the filter coefficient set in advance, and the setting unit is further configured to, when the respective filter coefficient has been set in all of the plurality of filters, select the selected filter from the plurality of filters other than the one or more filter in which the filter coefficient was set in advance.

3. The howling suppressing apparatus of claim 2, wherein the detecting unit is further configured to divide the audio signal into a plurality of frequency bands to detect howling in each of the divided frequency bands and to maintain a count of a number of times howling has been detected for each of the plurality of frequency bands, and the setting unit is further configured to, when the respective filter coefficient has been set in all of the plurality of filters, select the selected filter from the plurality of filters other than a filter in which there is set a filter coefficient for suppressing howling in a frequency band for which the count of the number of times howling has been detected is equal to or greater than a predetermined number of times.

4. The howling suppressing apparatus of claim 3, further comprising a gain adjusting unit configured to reduce the gain of the audio signal on at least one of the input side and the output side of the plurality of filters after a filter coefficient for suppressing howling is set in at least one filter among the plurality of filters.

5. The howling suppressing apparatus of claim 4, wherein the gain adjusting unit is further configured to reduce the gain of the audio signal after filter coefficients for suppressing howling are set in all of the plurality of filters.

6. The howling suppressing apparatus of claim 2, further comprising a gain adjusting unit configured to reduce the gain of the audio signal on at least one of the input side and the output side of the plurality of filters after a filter coefficient for suppressing howling is set in at least one filter among the plurality of filters.

7. The howling suppressing apparatus of claim 6, wherein the gain adjusting unit is further configured to reduce the gain of the audio signal after filter coefficients for suppressing howling are set in all of the plurality of filters.

8. The howling suppressing apparatus of claim 1, wherein the detecting unit is further configured to divide the audio signal into a plurality of frequency bands to detect howling in each of the divided frequency bands and to maintain a count of a number of times howling has been detected for each of the plurality of frequency bands, and the setting unit is further configured to, when the respective filter coefficient has been set in all of the plurality of filters, select the selected filter from the plurality of filters other than a filter in which there is set a filter coefficient for suppressing howling in a frequency band for which the count of the number of times howling has been detected is equal to or greater than a predetermined number of times.

9. The howling suppressing apparatus of claim 8, further comprising a gain adjusting unit configured to reduce the gain of the audio signal on at least one of the input side and the output side of the plurality of filters after a filter coefficient for suppressing howling is set in at least one filter among the plurality of filters.

10. The howling suppressing apparatus of claim 9, wherein the gain adjusting unit is further configured to reduce the gain of the audio signal after filter coefficients for suppressing howling are set in all of the plurality of filters.

11. The howling suppressing apparatus of claim 1, further comprising a gain adjusting unit configured to reduce the gain of the audio signal on at least one of the input side and the output side of the plurality of filters after a filter coefficient for suppressing howling is set in at least one filter among the plurality of filters.

12. The howling suppressing apparatus of claim 11, wherein the gain adjusting unit is further configured to reduce the gain of the audio signal after filter coefficients for suppressing howling are set in all of the plurality of filters.

* * * * *